Figure 1:
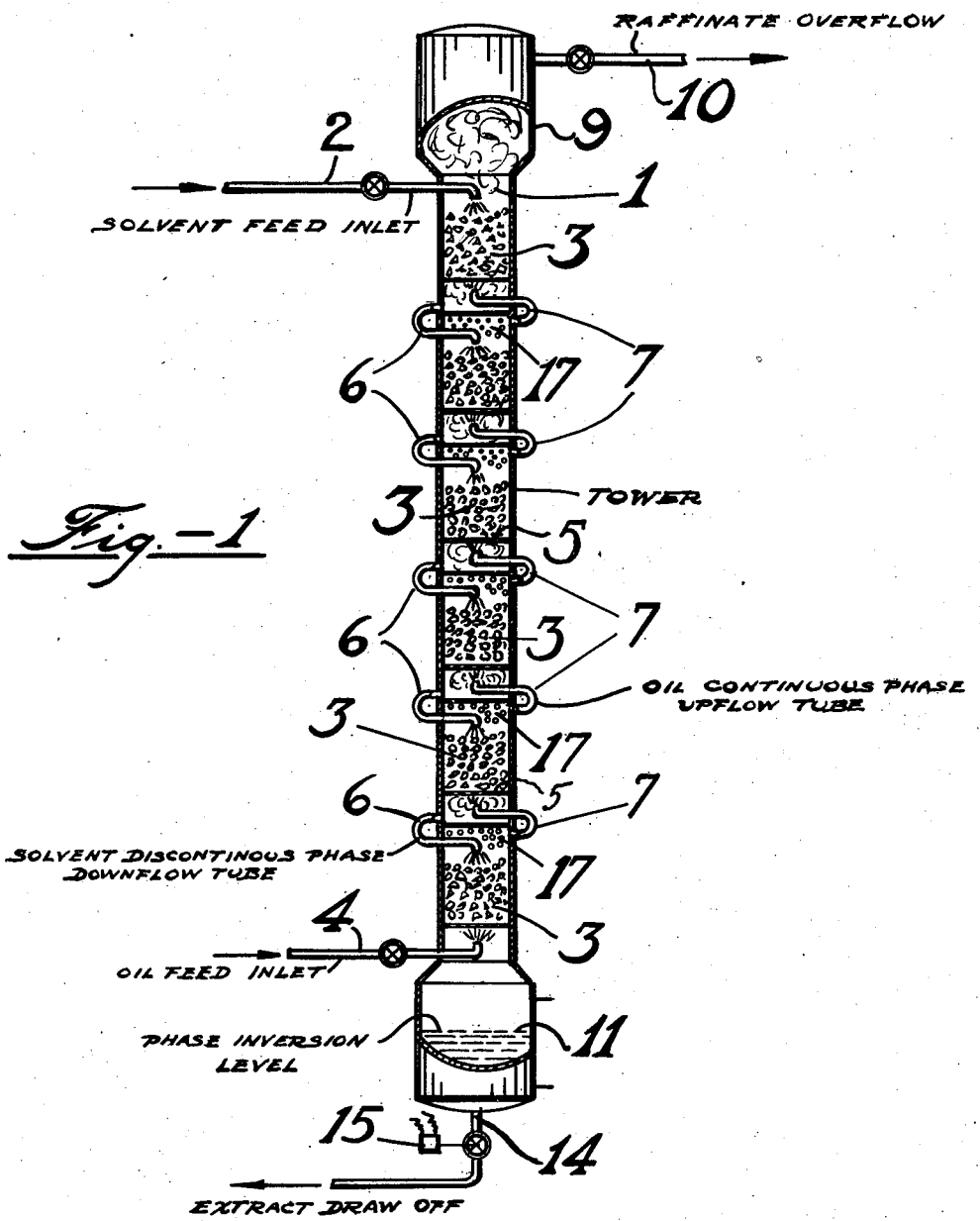

Jan. 14, 1941.  B. C. BELDEN  2,228,434
SOLVENT EXTRACTION PROCESS
Filed June 4, 1938  2 Sheets-Sheet 2

Burton C. Belden Inventor
By P. L. Young Attorney

Patented Jan. 14, 1941

2,228,434

UNITED STATES PATENT OFFICE 2,228,434

SOLVENT EXTRACTION PROCESS

Burton C. Belden, Cranford, N. J., assignor to Standard Oil Development Company, a corporation of Delaware Application June 4, 1938, Serial No. 211,747

6 Claims. (Cl. 196—13)

The present invention relates to an improved process of operating a solvent extraction tower or similar apparatus. It particularly relates to a method of operating extraction towers in which at least one phase and preferably two phases are liquid. The improved process of the present invention is secured by creating a surging or pulsating motion within said extraction tower or similar apparatus.

It is well known in the art to operate towers or similar equipment in which a liquid and gas or a liquid and liquid are commingled and are in intimate contact with each other and in which certain constituents of one phase are dissolved and removed in the other phase or phases. These processes as a general rule are carried out in towers which may contain catalytic or contact masses, packing members, dispersing trays, settling trays and the like. These processes are usually conducted with countercurrent flow in which one phase is introduced at the top of the tower and the other at the bottom or in processes in which, for instance, a third phase may be introduced at another point on the tower.

For example, a well known process of the type described, is a method of refining mineral oils and especially petroleum lubricating oils. In this process the relatively more aromatic materials are separated from the relatively more paraffinic constituents of the lubricating oil by means of selective solvents in order to secure a high quality lubricating oil. The usual method employed is to use solvents of the class which have a preferential selectivity for the aromatic type compounds and to intimately contact the appropriate solvent or solvent mixture under suitable conditions with the lubricating oil being treated. Solvents of this class are, for example, sulfur dioxide, furfural, aniline, phenol, beta beta dichlor diethyl ether, nitro benzene and the like. These may be employed in any desired combination or may be modified with regard to selectivity and solvent power by the addition of inert solvents, as for example, by the addition of water, alcohols, or glycols.

In processes of this type, the operations are usually carried out by various continuous countercurrent treating methods. In a tower treating operation, one phase, usually the solvent, is led into the top of the tower. This phase flows downwardly through the tower intimately contacting a countercurrently flowing oil phase which is fed into the bottom of the tower. In processes of this character, many devices have been tried in an attempt to secure more intimate and efficient contact between the respective phases and to secure a more rapid and cleaner separation for the purpose of improving the quality and yield, and for the purpose of increasing the capacity of the particular treating apparatus. For example, it is known to use contact masses, pierced plates and other types of distributing means, weir overflows, settling plates and the like.

However, in all processes of the type described, the flow of the respective phases throughout the tower is relatively uniform. Under these conditions it is obvious that various areas or zones tend to form at particular spots in the tower, as for instance, beneath plates and at other restricted points. These areas are characterized by partial or complete segregation of one of the liquid phases and are therefore of limited usefulness for phase-contacting purposes. Furthermore, if a catalyst or contact mass or pierced plates and the like are used, any carbonaceous or highly viscous materials suspended in either liquid phase tend to settle on the surfaces and in the restricted passageways of the same, thereby descreasing the catalytic activity or tending to impair liquid flow through the tower.

The process of the present invention not only overcomes these difficulties and disadvantages, but also secures velocity pulses which improve the dispersion of one phase in the other and also secure better distribution and mixing of the respective phases with consequent more effective carrying out of the extraction operation. The process of the present invention creates an intermittent pulsing motion within the tower by any desirable means, as for example, by intermittent or irregular injection of a particular phase or by intermittent or irregular withdrawal of a particular fraction or fractions. The process of the present invention may be more readily understood by reference to the attached figures which are given for the purpose of illustrating several methods of conducting the process and which are not to be construed as limiting the invention in any manner whatsoever.

Figure 1 is a diagrammatical view of a solvent treating tower in which, for the purposes of illustration, a solvent is fed into the upper part of tower 1 through feed line 2. The solvent flows down through the tower intimately contacting upflowing particles of oil which are introduced into tower 1 by means of feed line 4. This tower is one of the conventional type and contains distributing plates 5, downflow tubes 6 and upflow tubes 7 respectively, which enable the continuous and the discontinuous phases to pass around the distributing plates. The raffinate layer is collected in section 9 and withdrawn through take-off line 10, whereas the solvent extract layer is collected in section 11 and withdrawn through line 14, being released through valve 15.

In towers of this construction or of similar construction, local areas or zones of a particular phase collect and do not mix in a satisfactory manner with the other phase. For example, local areas of the oil collect in zone 17 beneath the distributing plates 5. Furthermore, in towers of this construction in which a catalytic or contacting mass or other distributing means are employed, it has been observed that when treating certain grades of feed materials, a carbonaceous material settles on the contact or catalytic masses or distributing plates and tends to clog up the contact masses or to reduce the activity of the catalytic substances.

The process of the present invention overcomes this by causing a pulsing or vibratory motion of the entire liquid content of said tower. This may be accomplished by several methods or by a combination of various methods. For example, the feed may be introduced at a constant rate through line 4 and the solvent may be introduced at a constant rate through line 2, but control valve 15 may be adjusted to fully open for an interval, thereby causing the entire liquid volume to move downwardly through the tower. This would cause a rapid movement throughout the tower and would disperse the zones below the distributing plates, since the downflowing liquid would flow at a high velocity downwardly through both the downflow and upflow tubes. By fully opening valve 15 it would cause a sufficient velocity and agitation in and around contact or catalytic masses which would tend to wash carbonaceous deposits off the same. Valve 15 at the end of a certain interval could then be fully or partially closed. The preferred operation in regard to valve 15 would be to have the valve fully open for a period and then to fully close the valve for a period three to four times in length the time the valve was opened. These conditions, of course, can vary widely and will depend upon the respective feed rates, the type of feed materials, the size, the volume and height of the tower, as well as upon the respective draw-off line sizes.

Another modification of the present invention as applied to a tower construction as shown by Figure 1 is to have a relatively uniform draw-off through line 14 and to inject the feed materials through line 4 at a non-uniform rate. By operating in this manner, a phase agitation would result which would increase the velocity through the upflow tubes around the distributing plates and would aid in the dispersion of the oil phase.

These methods of operating may be used alone or may be combined. Other modifications of the tower may also be made. For example, valve 15 may be hand operated or may be electrically operated from a time clock or may be operated by a device which fully opens when the interface level rises to a certain point in the tower and closes when the interface level drops to a second lower point in the tower.

Figure 2:
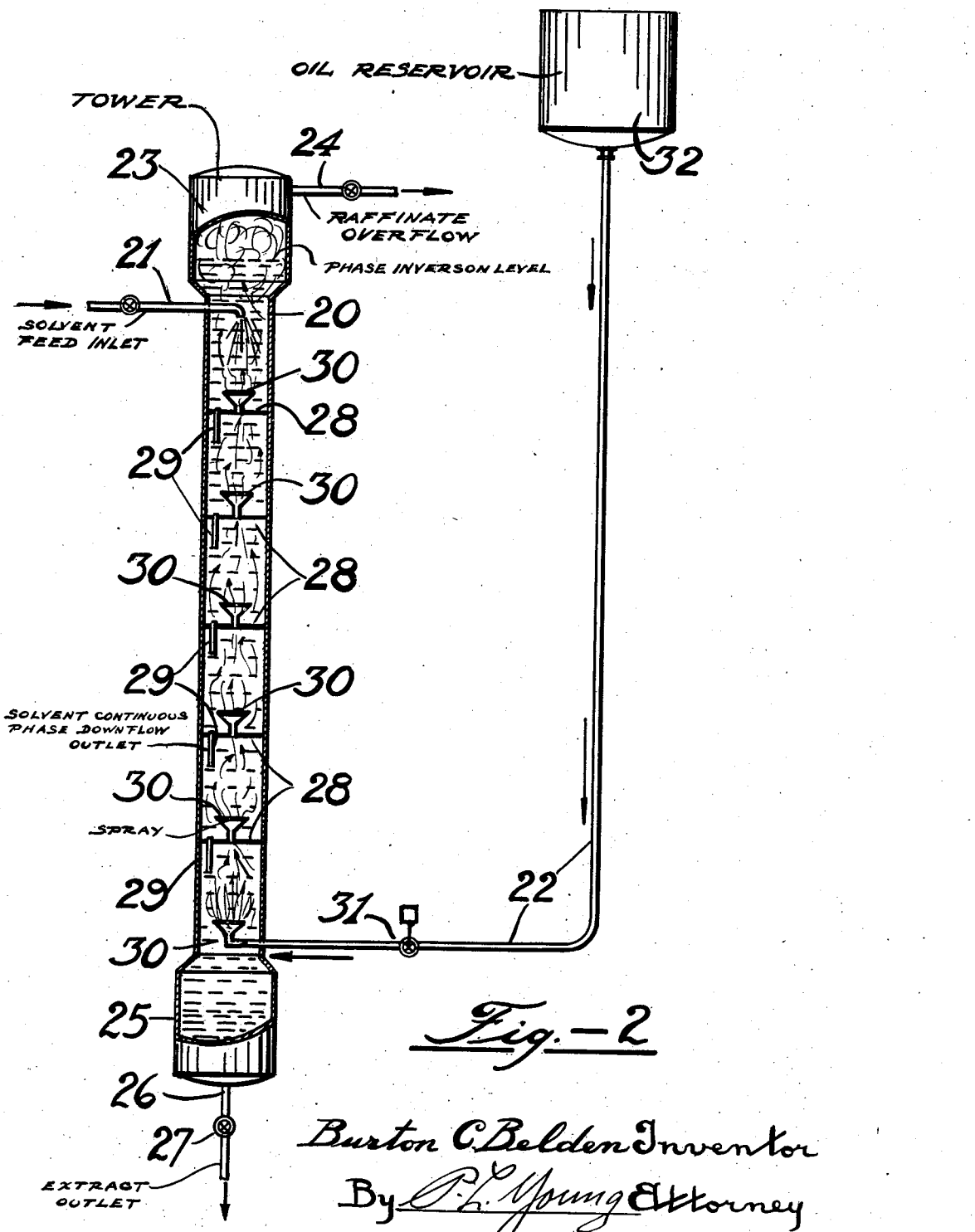

Another modification of the invention may be readily understood by reference to Figure 2. For purposes of simplicity, it is assumed that the material being treated is a petroleum oil of a lighter specific gravity than the solvent being used. In this figure, the selective solvent is introduced into tower 20 through feed line 21 and flows downwardly through the tower intimately contacting the feed material flowing upwardly through the tower which is fed into tower 20 by means of feed line 22. The raffinate collects in section 23 of the tower and is withdrawn through take-off line 24. The solvent extract collects in section 25 and is withdrawn through line 26 controlled by means of valve 27. In this tower the downflowing solvent is distributed over plates 28 and flows through spouts 29. The upflowing oil is collected under plates 28 and flows upwardly and is dispersed by means of the oil phase sprays 30. The operation of a tower of this or similar construction in accordance with the present invention is to withdraw the solvent extract phase at a relatively uniform rate through line 26 controlled by valve 27 which may be hand operated or controlled in any other manner desirable, as for example, by electrical contacts which maintain the interface level at a specific or certain level. The feed oil, however, is introduced through line 22 at a non-uniform or pulsing rate. This is accomplished by the control valve 31 which may fully open or fully close, thereby allowing the feed material to be injected into the tower at a non-uniform rate. Reservoir 32 may be employed for injecting the feed material into the tower when valve 31 is open. However, other similar means may be utilized, as for example, centrifugal pumps or pressure equipment. Tower 20 may contain contact or catalytic masses or any other means for distributing or directing the respective phases.

By operating the tower in the manner described, it is possible to greatly increase the velocity through the oil phase sprays, thereby getting considerably greater dispersion and also causing agitation throughout the tower which greatly increases the efficiency and the capacity of the equipment.

The following example is given for purposes of illustrating the invention and is not to be construed as limiting the invention in any manner whatsoever.

*Example*

In a solvent treating operation conducted in a tower containing suitable distributing and contacting means, a lubricating oil fraction is fed into the bottom of the tower. The oil flows upwardly through the tower intimately contacting downflowing phenol which is introduced into the top of the tower. The phenol is the continuous phase and the interface between the solvent rich layer and the solvent poor layer is maintained in the section above the solvent feed inlet. The interface is permitted to rise from an initial point above the solvent feed inlet of the tower at a gradual relatively slow rate to a second pre-determined point above the starting point. When the interface level reaches the second pre-determined point, suitable means are employed to open a valve in the solvent extract take-off line, thereby causing the interface level to fall rapidly to the lower initial starting point, at which level suitable means are provided to activate the release valve on the solvent extract take-off line, restricting the flow and thus causing the interface to rise and pass through similar succeeding cycles.

The following data serve to illustrate the above method of operating:

Table

| Unit time | Unit vols. of lube oil feed | Unit vols. of phenol feed | Unit vols. of raffinate removed | Unit vols. of extract removed |
| --- | --- | --- | --- | --- |
| 1 | 1 | 2 | 1 | 0 |
| 2 | 1 | 2 | 1 | 0 |
| 3 | 1 | 2 | 1 | 6 |
| 4 | 1 | 2 | 1 | 0 |
| 5 | 1 | 2 | 1 | 0 |
| 6 | 1 | 2 | 1 | 6 |

The above example illustrates a process in which the solvent extract release valve is fully closed for several unit times and then opened sufficiently for an initial unit time to remove the solvent extract accumulated for both periods. The operation may be varied so that the solvent extract valve may be partially open at all times and at periodic intervals fully open to create a surging or pulsating motion. It is to be noted that in the above example the raffinate is removed at a uniform rate. This is accomplished by pumping or may also be accomplished by having a raffinate reservoir in the tower above the point at which the raffinate is withdrawn so that when the liquid level in the tower falls there will be sufficient head to remove the raffinate phase. The raffinate, however, may be removed at a non-uniform rate if desirable.

A preferred method is to operate in a manner so that at periodic intervals the velocity of the one phase at least doubles as it passes through the catalytic masses or draw-off line. Another preferred method of operating is to have the interface level build up from any appropriate point as, for instance, from a point immediately above the oil inlet to a point from three inches to twenty-four inches over the initial point during the period from one minute to ten minutes and then to allow the interface level to drop from the upper point to the starting point during a period from one-quarter to one-half the time it took to build up.

It was found that when the tower was operated in accordance with the present invention, the catalytic and contact masses remained clear and contained no adhered or deposited matter. When operated under a normal method in which a relatively uniform flow was maintained, these contact masses, pierced plates and catalytic masses accumulated deposited and adhered matter which necessitated occasional shutdowns of the apparatus in order to clean the same. It was furthermore found that when an operation was conducted in a manner of the present invention, more intimate contact between the respective phases was secured which resulted in a better and cleaner separation and which increased the capacity of the apparatus.

The invention is not to be limited by any theory or mode of operation, but only by the following claims in which it is desired to claim all novelty insofar as the prior art permits.

I claim:

1. Improved process of operating a countercurrent solvent treating tower in which phenol is introduced into the top of the tower and oil is introduced into the bottom of the tower, comprising allowing the interface between the respective layers to rise slowly from an initial point to a pre-determined point above the initial point and then allowing the interface to fall rapidly to the initial point by means of intermittently withdrawing one phase.

2. Process of operating a countercurrent solvent treating tower in which a petroleum oil is contacted with a solvent under conditions to form a raffinate phase and a solvent extract phase, and in which the solvent is the continuous phase, comprising adjusting the feed and withdrawal rates of said tower so that the interface level in an initial stage rises from about 3 to 24 inches during a time period of from 1 to 10 minutes and in a secondary stage falls the distance through which it rose in about one-half the time required to rise.

3. Process of operating a countercurrent solvent treating tower in which a petroleum oil is contacted with a solvent under conditions to form a raffinate phase and a solvent extract phase, comprising adjusting the feed and withdrawal rates of said tower so that the interface level in an initial stage rises slowly over a fixed distance and in a secondary stage drops rapidly over said fixed distance.

4. Process in accordance with claim 3 in which the time required for said interface level to fall over said fixed distance is less than one-half of the time required for said interface level to rise over said fixed distance.

5. Process of operating a countercurrent solvent treating tower in which a petroleum oil is contacted with a solvent under conditions to form a raffinate phase and a solvent extract phase, comprising adjusting the feed and withdrawal rates of said tower so that the interface level in an initial stage changes slowly in a positive direction over a fixed distance and in a secondary stage changes rapidly in a negative direction over said fixed distance.

6. Process in accordance with claim 5 in which the time required for said interface level to change in a negative direction over said fixed distance is less than one-half the time required for said interface level to change in a positive direction over said fixed distance.

BURTON C. BELDEN.